US011984283B2

(12) United States Patent
Katzensteiner et al.

(10) Patent No.: US 11,984,283 B2
(45) Date of Patent: May 14, 2024

(54) ULTRA-FAST POLARIZED RELAY FOR HYBRID SWITCHING SYSTEMS

(71) Applicant: Eaton Intelligent Power Limited, Dublin (IE)

(72) Inventors: Matthias Katzensteiner, Vienna (AT); Aloysius Hemmer, Hengelo (NL)

(73) Assignee: EATON INTELLIGENT POWER LIMITED, Dublin (IE)

( * ) Notice: Subject to any disclaimer, the term of this patent is extended or adjusted under 35 U.S.C. 154(b) by 12 days.

(21) Appl. No.: 17/626,510

(22) PCT Filed: Jul. 9, 2020

(86) PCT No.: PCT/EP2020/069368
§ 371 (c)(1),
(2) Date: Jan. 12, 2022

(87) PCT Pub. No.: WO2021/008991
PCT Pub. Date: Jan. 21, 2021

(65) Prior Publication Data

US 2022/0293377 A1 Sep. 15, 2022

(30) Foreign Application Priority Data

Jul. 16, 2019 (GB) ..................................... 1910159

(51) Int. Cl.
*H01H 50/24* (2006.01)
*H01H 50/56* (2006.01)
*H01H 50/60* (2006.01)

(52) U.S. Cl.
CPC ............ *H01H 50/24* (2013.01); *H01H 50/56* (2013.01); *H01H 50/60* (2013.01)

(58) Field of Classification Search
CPC ........ H01H 50/24; H01H 50/56; H01H 50/60; H01H 3/3042; H01H 9/542; H01H 51/2272; H01H 50/54; H01H 36/00; H01H 50/643; H01H 50/648; H01H 51/14
See application file for complete search history.

(56) References Cited

U.S. PATENT DOCUMENTS 2,671,863 A 3/1954 Matthews
2,805,301 A * 9/1957 Shaw .................. H01H 50/305 335/193

(Continued)

FOREIGN PATENT DOCUMENTS

EP 0186171 A2 7/1986
EP 2940708 A1 11/2015

*Primary Examiner* — Bernard Rojas
(74) *Attorney, Agent, or Firm* — LEYDIG, VOIT & MAYER, LTD.

(57) ABSTRACT

A relay includes an electromagnetic drive unit with a rotatable armature and a yoke. The rotatable armature includes a first magnetic contact region and the yoke includes a second magnetic contact region. The first magnetic contact region is in touch with the second magnetic contact region in a first state of the relay. The relay further includes at least one immovable first electric contact and a moveable contact arm with at least one second electric contact. The first electric contact contacts the second electric contact in the first state. The rotatable armature and the moveable contact arm are positioned together on a shaft and the shaft is embodied as a torsional element.

15 Claims, 3 Drawing Sheets

(56) References Cited

U.S. PATENT DOCUMENTS

| | | | | | |
|---|---|---|---|---|---|
| 2,876,310 | A * | 3/1959 | Larsh | H01H 50/54 335/190 |
| 3,109,903 | A * | 11/1963 | Lychyk | H01H 50/30 335/125 |
| 3,161,744 | A | 12/1964 | Thorne et al. | |
| 3,189,706 | A * | 6/1965 | Helmstetter | H01H 71/1054 335/125 |
| 4,554,521 | A | 11/1985 | Hurter | |
| 4,695,813 | A * | 9/1987 | Nobutoki | H01H 51/229 335/181 |
| 4,881,053 | A * | 11/1989 | Tanaka | H01H 51/229 335/85 |
| 5,959,518 | A | 9/1999 | Passow | |
| 7,623,012 | B2 * | 11/2009 | Baumbach | F01L 9/20 335/229 |
| 2021/0012992 | A1 * | 1/2021 | Nojima | H01H 51/27 |
| 2021/0074499 | A1 * | 3/2021 | Engewald | H01H 50/021 |

* cited by examiner

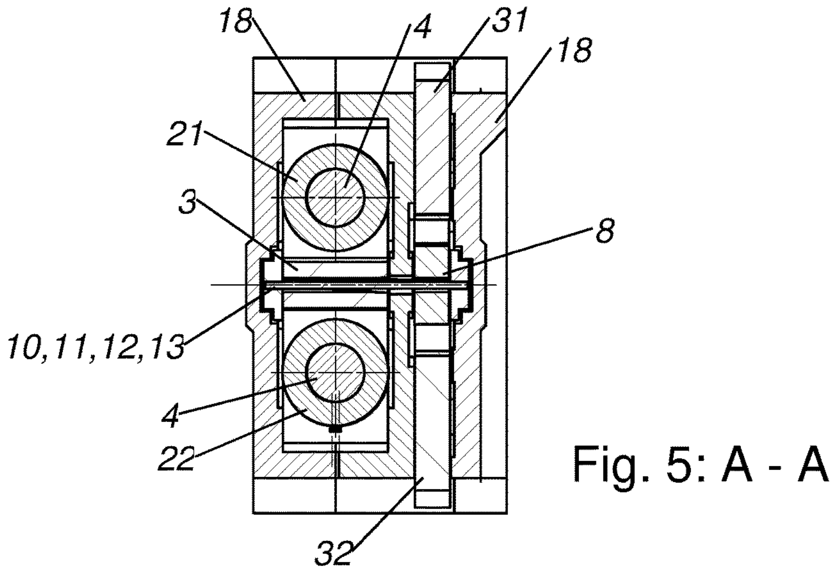
Fig. 5: A - A
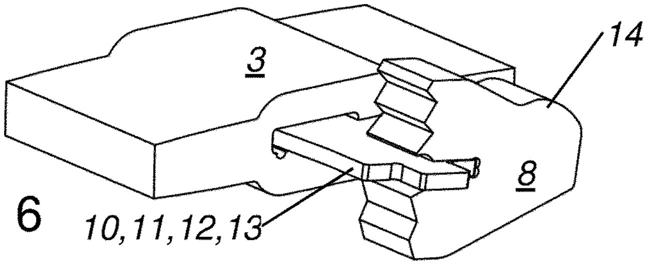
Fig. 6
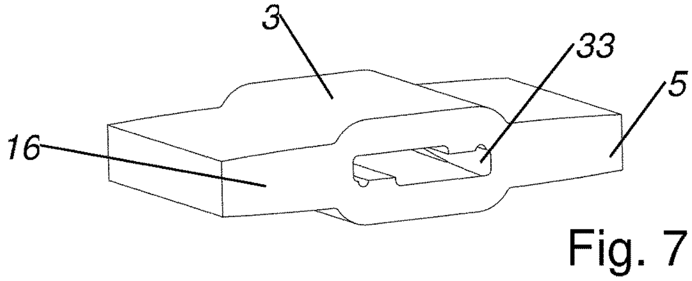
Fig. 7
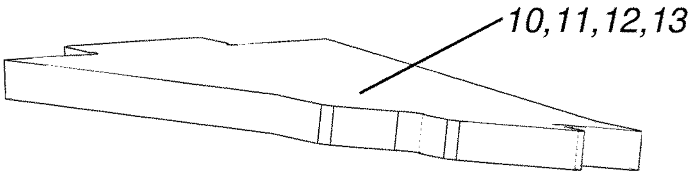
Fig. 8

ULTRA-FAST POLARIZED RELAY FOR HYBRID SWITCHING SYSTEMS

CROSS-REFERENCE TO PRIOR APPLICATIONS

This application is a U.S. National Phase application under 35 U.S.C. § 371 of International Application No. PCT/EP2020/069368, filed on Jul. 9, 2020, and claims benefit to British Patent Application No. GB 1910159.1, filed on Jul. 16, 2019. The International Application was published in English on Jan. 21, 2021 as WO/2021/008991 under PCT Article 21(2).

FIELD

The present disclosure relates to a relay.

BACKGROUND

Electromagnetic relays are well known and part of lots of electric devices. Even in times of semiconductor switching elements classic mechanic relays have the advantage of lower resistance and lower dissipated energy.

Electromagnetic relays are part of so called hybrid switchgears, especially hybrid circuit breakers (HCB). Hybrid switchgear contain a semiconductor switching unit, which is shunted by a relay. This relay is typically called bypass-relay. In normal operation the contacts of the bypass-relay are closed and the semiconductor switching unit is typically in non-conductive mode. It is also possible that the semiconductor switching unit is in a conductive or a semi conductive mode. The current passing the switchgear flows through the low resistance bypass-relay.

In case of a short circuit switch-off operation, the bypass-relay has to open their contacts as fast as possible. The faster the contact opening operation, the faster the current commutates to the semiconductor switching unit. Fast opening bypass-relays enable the semiconductor switching unit to switch off a rising current at a lower level, compared to slower opening contacts. If ability for switching off high currents is not necessary for the semiconductor switching unit, the complete semiconductor switching unit can be realized with semiconductor elements having lower maximum current capability. Such semiconductors are physically smaller compared to high current semiconductors. They have lower resistance and heat dissipation, and they cause a lower loop inductance of the semiconductor switching unit, which results in a lower current commutation time.

The contact opening time or speed of the bypass-relay is a central point in the design of a hybrid circuit breaker. This time respective speed limits the minimization of the complete switchgear. The real contact opening time of the bypass-relay has a direct influence to most other parts, especially the necessary power rating of the semiconductors. A slow bypass-relay requires a semiconductor switching unit with a high power rating. As semiconductors with high power rating have huge volumes, the contact opening time of the bypass-relay is the most influencing factor for the total volume of hybrid switchgear.

The contact opening time is in part influenced by the power of the electromagnetic drive system. The power of the electromagnetic drive system in real systems is limited by many factors, especially the power of the power supply, and again the total available volume of the device.

It is a drawback of known or available relays that their contact opening time is too long to build compact hybrid circuit breakers. A further drawback is that the opening time increases over a few switching cycles.

SUMMARY

In an embodiment, the present invention provides a relay, comprising: an electromagnetic drive unit with a rotatable armature and a yoke, the rotatable armature comprising a first magnetic contact region, the yoke comprising a second magnetic contact region, the first magnetic contact region being in touch with the second magnetic contact region in a first state of the relay; and at least one immovable first electric contact and a moveable contact arm with at least one second electric contact, the first electric contacting the second electric contact in the first state, wherein the rotatable armature and the moveable contact arm are positioned together on a shaft, and the shaft is embodied as a torsional element.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 5 shows a sectional view according the cutting plane A-A according FIG. 3;

FIG. 6 shows the armature, the shaft and the contact arm of a relay according FIG. 1, with the contact arm sectional opened;

FIG. 7 shows the armature according FIG. 6; and

FIG. 8 shows the shaft according FIG. 6.

DETAILED DESCRIPTION

In some embodiments, the present invention overcomes drawbacks of the state of the art by providing a relay with a very low or short contact opening time respective fast opening contacts. In some embodiments, the present invention provides a relay with low resistance and low power requirements for the fast switching operation.

As a result a relay according the invention has a high contact pressure causing a low resistance. The relay further has no air gap between the yoke and the armature, causing low power requirements for the coils of the electromagnetic drive unit in the event of switching. The high contact pressure as well as the missing air gap can be provided over a lot of switching operations by the torsional element, which compensates physical inexactness and physical changes in the electric contact system as well as in the magnetic system. As it is sufficient to do this compensation in one sense of rotation, it is further possible to design the torsional element respective the shaft to be rigid or motion supporting in the time relevant sense of rotation for opening the contacts.

The arrangement of the armature and the contact arm on the same shaft provides a system with low inert mass and a low moment of inertia. As a reason the armature and the contact arm can be accelerated very fast. The acceleration of the armature and the contact arm requires low energy.

As a result, a relay according the invention can switch off a low voltage electric current within 500 μs.

Figure 1:
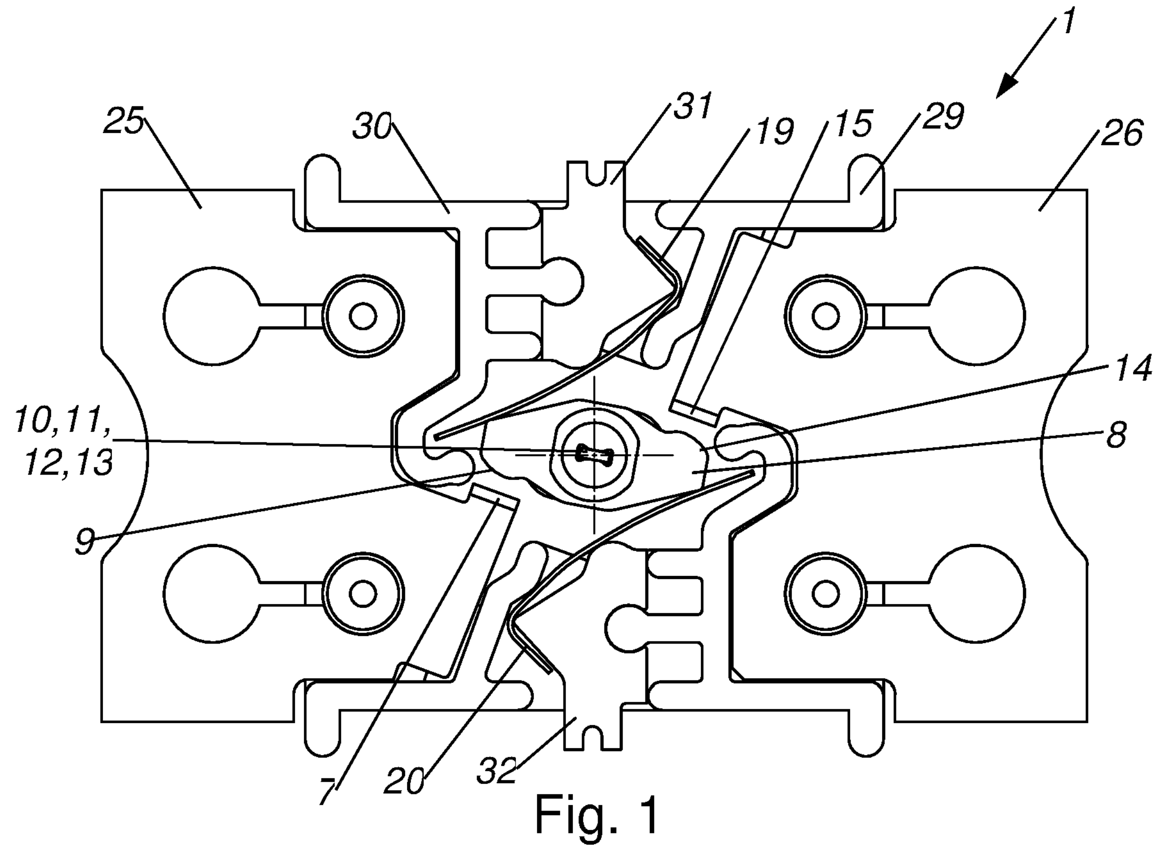
FIG. 1 shows an open front side of a relay according the invention in the second state.
Figure 2:
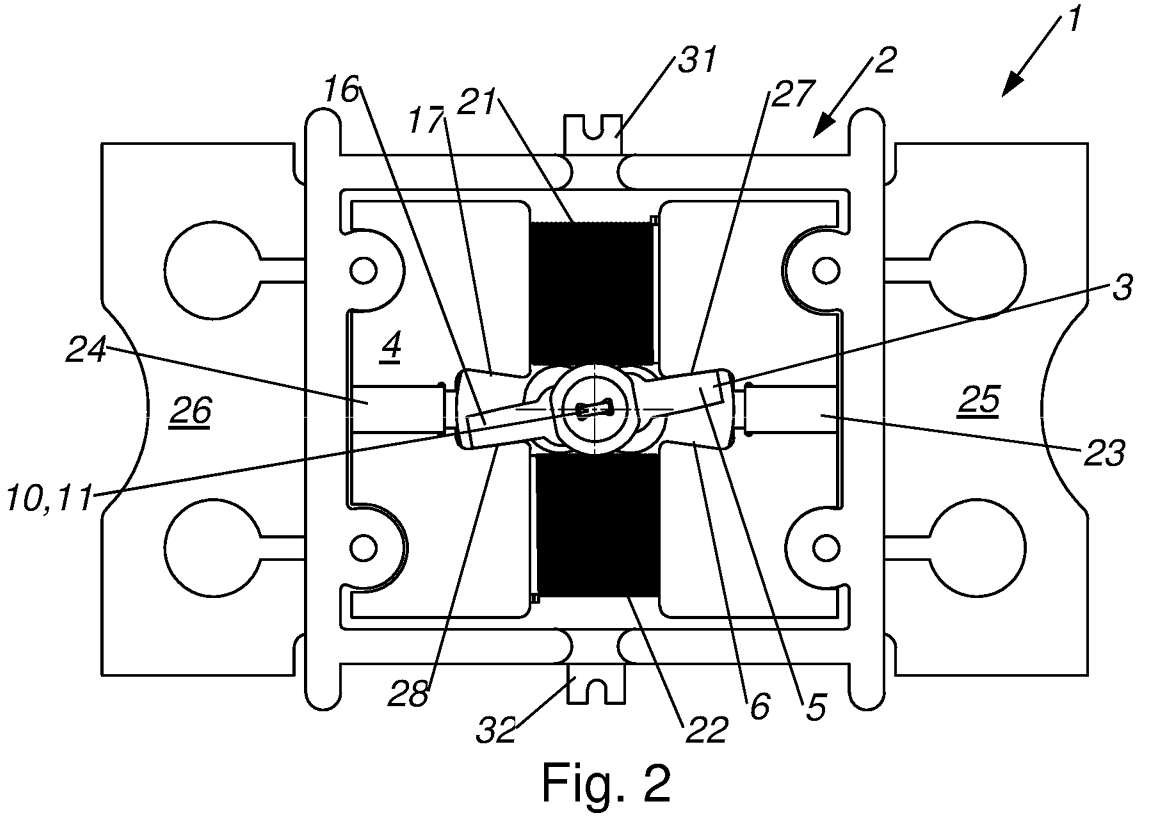
FIG. 2 shows an open back side of the relay according FIG. 1.
Figure 3:
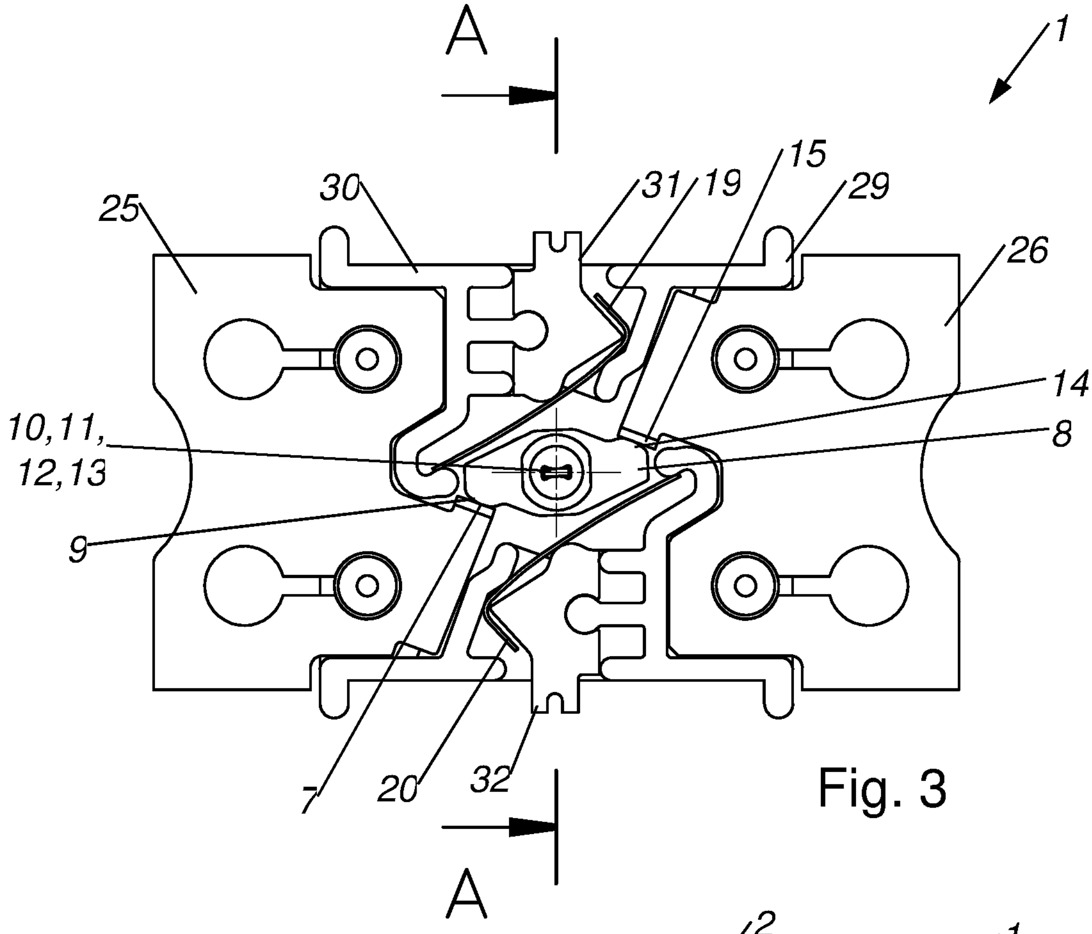
FIG. 3 shows an open front side of the relay according FIG. 1 in the first state.
Figure 4:
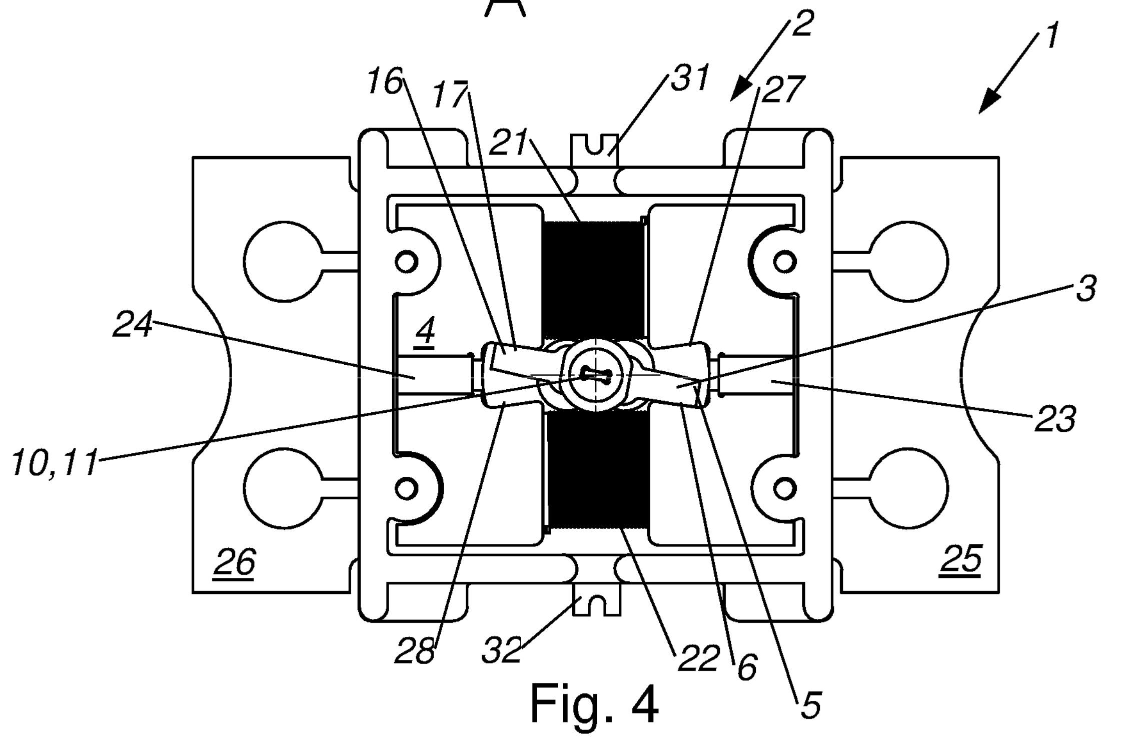
FIG. 4 shows an open back side of the relay according FIG. 3.

FIGS. 1 to 5 shows a relay 1 comprising an electromagnetic drive unit 2 with a rotatable armature 3 and a yoke 4, the armature 3 comprises a first magnetic contact region 5, the yoke 4 comprises a second magnetic contact region 6, the first magnetic contact region 5 being in touch with the second magnetic contact region 6 in a first state of the relay 1, the relay 1 further comprises at least an immovable first electric contact 7 and a moveable contact arm 8 with at least a second electric contact 9, the first electric contact 7 contacts the second electric contact 9 in the first state, with the armature 3 and the contact arm 8 are arranged together on a shaft 10, and with the shaft 10 is embodied as torsional element 11.

As a result, a relay 1 according the invention has a high contact pressure causing a low resistance. The relay 1 further has no air gap between the yoke 4 and the armature 3, causing low power requirements for the coils 21, 22 of the electromagnetic drive unit 2 in the event of switching. The high contact pressure as well as the missing air gap can be provided over a lot of switching operations by the torsional element 11, which compensates physical inexactness and physical changes in the electric contact system as well as in the electromagnetic system. As it is sufficient to do this compensation in one sense of rotation, it is further possible to design the torsional element 11 respective the shaft 10 to be rigid or motion supporting in the time relevant sense of rotation for opening the electric contacts 7, 9, 14, 15.

The arrangement of the armature 3 and the contact arm 8 on the same shaft 10 provides a system with low inert mass and a low moment of inertia. As a reason the armature 3 and the contact arm 8 can be accelerated very fast. The acceleration of the armature 3 and the contact arm 8 requires low energy.

As a result, a relay 1 according the invention can switch off a low voltage electric current within 500 μs or less.

The actual relay 1 is preferably a relay 1 for low voltage applications.

The relay 1 is especially indented for the use as bypass-relay in a hybrid circuit breaker comprising at least a semiconductor switching unit and a bypass-relay, with the bypass-relay is arranged in parallel to the semiconductor switching unit. A hybrid circuit breaker according this concept is described in WO2015/028634 by the applicant. Preferably, the bypass-relay is embodied as relay 1 according the invention.

The relay 1 comprises an electromagnetic drive unit 2 and an electric switching apparatus.

The electromagnetic drive unit 2 comprises a rotatable armature 3 and a yoke 4. The electromagnetic drive unit 2 further comprises at least a first coil 21, wound at least in part around an area of the yoke 4. According the preferred embodiment the electromagnetic drive unit 2 further comprises a second coil 22, wound at least in part around an area of the yoke 4.

The electromagnetic drive unit 2 especially further comprises at least a first permanent magnet 23, which is arranged between two parts of the yoke 4. According the preferred embodiment the electromagnetic drive unit 2) further comprises a second permanent magnet 24, which is also arranged between two parts of the yoke 4.

According the preferred embodiment, as shown in FIGS. 1 to 5, the arrangement comprising the yoke 4, the first and second coil 21, 22 and the first and second permanent magnet 23, 24 is essentially symmetrical.

The actual relay 1 is able to be in two different stable states. The first state is defined as a switched on state. In this state, the electric contacts 7, 9, 14, 15 are closed respective contacted, and an electric current flow through the relay 1 is enabled. The second state is defined as a switched off state. In this state the electric contacts 7, 9, 14, 15 are opened respective separated, and an electric current flow through the relay 1 is disabled.

The relay 1 according the actual invention is a bistable relay.

The armature 3 is rotatable mounted. The armature 3 comprises at least a first arm, with a first magnetic contact region 5 to get in touch with a second magnetic contact region 6 of the yoke 4. In the first state the first magnetic contact region 5 is in touch with the second magnetic contact region 6. The first magnetic contact region 5 comprises preferably both sides of the first arm.

According the preferred embodiment the yoke 4 comprises a further magnetic contact region on an opposite side of the second magnetic contact region 6, which actually is called fifth magnetic contact region 27. The armature 3 is especially designed in a way, that the first magnetic contact region 5 is in touch with the fifth magnetic contact region 27 in the second state of the relay.

According the preferred embodiment as shown in FIGS. 1 to 5 the armature 3 comprises a second arm, with the second arm is embodied as third magnetic contact region 16. Preferably the armature 3 is embodied essentially symmetrically. According this embodiment the yoke 4 further comprises a fourth magnetic contact region 17 and a sixth magnetic contact region 28. In the first state the third magnetic contact region 16 is in touch with the fourth magnetic contact region 17. In the second state the third magnetic contact region 16 is in touch with the sixth magnetic contact region 28.

The electric contact mechanism comprises at least an immovable first electric contact 7, which is arranged on a first contact piece 25, comprising at least one opening or a soldering log for external connecting. The electric contact mechanism further comprises at least one moveable contact arm 8. On the contact arm 8 at least a second electric contact 9 is arranged.

In the first state the first electric contact 7 contacts the second electric contact 9.

According the preferred embodiment, as shown in FIGS. 1 to 5, contact arm 8 is substantially symmetric and comprises a third electric contact 14 to contact an immovable fourth electric contact 15 of the relay 1. The immovable fourth electric contact 15 is arranged on a second contact piece 26, comprising at least one opening or a soldering log for external connecting.

The contact arm 8 according the preferred embodiment provides a double contact making or breaking and is also called contact bride.

All the electric contacts are embodied as switching contacts. They are not embodied as sliding contacts or blade contacts of any kind.

The contact arm 8 is coupled to the armature 3 by the shaft 10. Both, the armature 3 and the contact arm 8 are arranged together on the same shaft 10. That shaft 10 is embodied as torsional element 11.

The shaft 10 can be formed according any material or form or comprising any cross-section, as long as it is flexible or elastic enough to compensate physical differences of the electromagnetic drive unit 2 and the electric contact system, in a way that the magnetic contact regions 5, 6, 16, 17, 27, 28 can get in touch without an air gap, and the electric contact areas 7, 9, 14, 15 are connected with sufficient contact pressure. The torsional element 11 further has to be flexible enough to compensate a predefined degree of changes in position and/or dimension of the magnetic contact regions 5, 6, 16, 17, 27, 28 and/or the electric contacts 7, 9, 14, 15.

According the preferred embodiment, the shaft 10 is embodied as torsional spring 12. This is a simple embodiment of the torsional element 11. Other terms for the torsional spring 12 are torsion spring or torsion bar or torque rod.

Especially the torsional spring 12 is embodied as flat spring 13. As a result it is easy to connect the armature to the contact arm 8 in a way that the connection is rigid in a direction of rotation intended to open the electric contacts 7, 9, 14, 15.

FIG. 8 shows the preferred embodiment of the shaft 10 as a flat torsional spring 12,13. FIG. 8 shows the twist of the flat spring 13.

According the specially preferred embodiment, the torsional spring 12 is further arranged and embodied to accelerate the contact arm 8 at the beginning of a separation action of the electric contacts 7, 9. This acceleration at the early beginning of the movement supports the armature 3 by opening the contacts 7, 9, 14, 15 and additionally reduces the contact opening time. This further acceleration can be provided by the twist of the flat spring 13, as shown in FIG. 8. The torsional spring 12 will be tight during the switch on operation and transferring the torque of the electromagnetic drive unit 2 as contact pressure to the electric contacts. At the beginning of a switch off operation the torsional spring 12 first accelerates the armature 3 and then the contact arm 8. The period of acceleration last as long as the contact arm 8 respective at least the second electric contact 9 is in contact with at least the immovable first electric contact 7.

FIG. 7 shows the armature 3 and the opening or recess 33 of the armature 3 for arranging of the shaft 10. This recess 33 contains two contact surfaces 34 for supporting the shaft 10 in form of a flat spring 13. The contact surfaces 34 of the recess 33 are preferably arranged on the same sides as the electric contact 9, 14 at the contact arm 8. According the point of view of FIGS. 6 and 7 the contact surface 34 on the right side is on the top area of the recess 33. The corresponding third electric contact 14 on the right side of the contact arm 8 is arranged on the top side of the contact arm 8.

The relay 1 comprises a relay-housing 18, which is shown in FIG. 5. The relay-housing 18 comprises two bushings for supporting the shaft 10. The shaft 10 is floating mounted in the relay-housing 18 with a definite tolerance of movement in directions perpendicular to an axle of the shaft 10. This enables the shaft 10 to compensate further changes in the geometry of the electromagnetic drive unit 2 and/or the electric contact system.

According a further preferred embodiment, the relay 1 comprises an auxiliary electric path form the first auxiliary contact piece 31 to the second auxiliary contact piece 32. The relay 1 respective the auxiliary electric path contains at least one auxiliary spring 19, 20, which is also an electric contact element. The auxiliary spring 19, 20 bias the contact arm 8 in direction to the first electric contact 7 in a second state, in which second state the second electric contact 9 is spaced apart from the first electric contact 7. According the preferred embodiment with an additional second auxiliary spring 20 the auxiliary electric path is closed in the second state. The auxiliary springs 19, 20 further support the electromagnetic drive unit 2 for bringing the contact arm 8 from the second state to the first state.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A relay, comprising:

an electromagnetic drive unit with a rotatable armature and a yoke, the rotatable armature comprising a first magnetic contact region, the yoke comprising a second magnetic contact region, the first magnetic contact region being in touch with the second magnetic contact region in a first state of the relay; and at least one immovable first electric contact and a moveable contact arm with at least one second electric contact, the first electric contact contacting the second electric contact in the first state, wherein the rotatable armature is connected to the moveable contact arm via a shaft, and wherein the shaft is embodied as a torsional element, thereby allowing the rotatable armature to rotate with respect to the movable contact arm through the torsion of the shaft.

2. The relay according to claim 1, wherein the shaft is embodied as a torsional spring.

3. The relay according to claim 2, wherein the torsional spring is embodied as a flat spring.

4. The relay according to claim 2, wherein the torsional spring is positioned and embodied to accelerate the moveable contact arm at the beginning of a separation action of the first electric contact and the second electric contact.

5. The relay according to claim 1, wherein the moveable contact arm is substantially symmetric and comprises a third electric contact to contact an immovable fourth electric contact of the relay in the first state, and wherein the armature is substantially symmetric and comprises a third magnetic contact region that is touchable with a fourth magnetic contact region of the electromagnetic drive unit.

6. The relay according to claim 1, wherein the relay comprises a relay-housing, and wherein the shaft is floating mounted in the relay-housing with a definite tolerance of movement in directions perpendicular to an axle of the shaft.

7. The relay according to claim 1, wherein the relay comprises at least one auxiliary spring, wherein the at least one auxiliary spring biases the moveable contact arm in a direction to the first electric contact in a second state, wherein in the second state, the second electric contact is spaced apart from the first electric contact.

8. A hybrid circuit breaker comprising at least a semiconductor switching unit and a bypass-relay, wherein the bypass-relay is arranged in parallel to the semiconductor switching unit, wherein the bypass-relay is embodied as the relay according to claim 1.

9. The relay according to claim 1, wherein the shaft accelerates the moveable contact at the beginning of separation of the first electric contact and the second electric contact.

10. The relay according to claim 9, wherein the acceleration of the shaft reduces the contact opening time of the relay.

11. The relay according to claim 1, wherein the torsion of the shaft provides a twisting deformation of the shaft.

12. The relay according to claim 1, wherein torsion of a portion of the shaft disposed between the moveable contact arm and the rotatable armature allows rotation of the rotatable armature with respect to the moveable contact arm.

13. A relay, comprising:

an electromagnetic drive unit with a rotatable armature and a yoke, the rotatable armature comprising a first magnetic contact region and a second magnetic contact region, the yoke comprising a third magnetic contact region and a fourth magnetic contact region, wherein in a first stage of the relay, the first magnetic contact region is in touch with the third magnetic contact region and the second magnetic contact region is in touch with the fourth magnetic contact region; and at least one immovable first electric contact and a moveable contact arm with at least one second electric contact, the first electric contact contacting the second electric contact in the first state, wherein the rotatable armature is connected to the moveable contact arm via a shaft, wherein the shaft is embodied as a torsional element, thereby allowing the rotatable armature to rotate with respect to the movable contact arm through the torsion of the shaft.

14. The relay of claim 13, wherein a torsion of portion of the shaft disposed between the moveable contact arm and the rotatable armature allows rotation of the rotatable armature with respect to the moveable contact arm.

15. A relay, comprising:

an electromagnetic drive unit with a rotatable armature and a yoke, the rotatable armature comprising a first magnetic contact region, the yoke comprising a second magnetic contact region, the first magnetic contact region being in touch with the second magnetic contact region in a first state of the relay; and at least one immovable first electric contact and a moveable contact arm with at least one second electric contact, the first electric contact contacting the second electric contact in the first state, wherein the rotatable armature is connected to the moveable contact arm via a shaft, wherein the shaft is embodied as a torsional element, thereby allowing the rotatable armature to rotate with respect to the movable contact arm through the torsion of the shaft, and wherein torsion of a portion of the shaft disposed between the moveable contact arm and the rotatable armature allows rotation of the rotatable armature with respect to the moveable contact arm.

* * * * *